EFFECT OF ALCOHOL CONCENTRATION ON DESWELLING OF A SULFONATED LOW CROSS-LINKED POLYSTYRENE RESIN

EFFECT OF SOLVENT CONCENTRATION (ACETONE AND DIOXANE) ON DESWELLING OF A SULFONATED LOW CROSS-LINKED POLYSTYRENE RESIN

United States Patent Office 3,791,981
Patented Feb. 12, 1974

3,791,981
VOLUME REDUCTION OF RADIOACTIVE ION EXCHANGE RESINS FOR DISPOSAL
Calvin Calmon, Springfield Township, N.J., assignor to Aerochem Research Laboratories, Inc.
Filed Apr. 7, 1971, Ser. No. 132,098
Int. Cl. C09k 3/00
U.S. Cl. 252—301.1 W                 12 Claims

ABSTRACT OF THE DISCLOSURE

Ion exchange resins which have become contaminated with radioactivate materials, are reduced in volume for purposes of disposal by treating the contaminated resins with certain solvents having a dielectric constant of about 45 or lower. Solvents, such as, methanol, ethanol and acetone may be used to reduce the volume of the contaminated resins prior to storage and/or disposal. The method of this invention as applied to disposal of radioactively contaminated ion exchange resins reduces the space required for storage and/or burial of bulk quantities of this type of radioactive waste material, provides a self-sealing medium within the storage containers to prevent small leaks when the containers are stored in an aqueous medium, and promotes burning of the resin in cases where incineration is desirable.

BACKGROUND OF THE INVENTION

This invention relates generally to radioactively contaminated ion exchange resins, and more particularly, to a method of treating radioactively contaminated ion exchange resins to reduce substantially the volume of such resins, thereby facilitating handling, storage and disposal of such resins.

Ion exchange resins are used in many processes in which the resin becomes contaminated with radioactive material. One of the major uses of ion exchange resins in processes wherein the resin becomes contaminated with radioactive material, is in nuclear power plants. Considerable amounts of radioactive waste materials are produced in nuclear power plants, and these wastes, generally found in coolant water and the like, must be recovered before the water is deposited into streams or waste lagoons, or before they are returned back to the operating units. The ion exchange resins are used to remove the ionic constituents from the contaminated fluid medium and also act as filter media for contaminated particulate matter and colloidal entities. For example, in boiling water reactors ion exchange resins are used for (a) treatment of the condensate, (b) purification of the coolant, and (c) treatment of the water used for storing the spent fuel. In pressurized water reactor plants, ion exchange resins are used for (a) purification of the coolant, (b) treatment of the water used for storing the spent fuel and (c) pretreatment of water before entering the steam generator or reactor.

When the ion exchange resins are exhausted, that is, when they cannot efficiently remove additional radioactive waste materials, or when the ion exchange resins become too "hot" or degraded from radiation, the resins are generally placed in cement tanks, sealed and then buried. This is one method for disposal of ion exchange resins which have been used both in nuclear reactors for electric power plants or in nuclear submarines, or when used for cleaning nuclear reactors. Since nuclear power plants are growing substantially in number and in size, there is an inrceased demand for ion exchange resins for treatment of fluid media contaminated with radioactive material which in turn creates new and increased burdens upon disposal facilities thereby increasing the burden of finding places to store and "dump" nuclear wastes.

In U.S. 2,616,847 it is disclosed that ion exchange resins are employed for concentrating waste solutions from neutronic reactors where large quantities of radioactive isotopes are formed in the fission of nuclear fuels. Cation exchange clays are contacted with waste solutions containing radioactive cations to adsorb the radioactive cations followed by heat treatment of the clay at high temperatures prior to burial to alter the crystal structure of the clay and thereby prevent extraction of the adsorbed radioactive cations. However, this method is not applicable to synthetic organic ion exchange resins which are contaminated with radioactive material. Heat treatment of the synthetic organic ion exchange resins leads to decomposition products and does not necessarily alter the polymer and ionic structure of such resins in such a way as to prevent extraction of the radioactive cations and/or anions. Furthermore, gaseous decomposition products and other volatile materials may be evolved and carry therewith radioactive contamination which would merely add to the existing disposal problems.

In certain cases radioactively contaminated synthetic organic ion exchange resins are destroyed by incineration techniques. Burning of these resins is generally difficult because (a) radioactively contaminated gases may be encountered and (b) the resins generally contain about 50% water.

As disclosed in U.S. 3,340,200 mixed bed ion exchange resins are used to remove the radioactive contaminants from water which is employed as a moderator, reflector, solvent or coolant in various types of reactors, and which by reason of its proximity to the reactor core and radiation sources, almost invariably becomes contaminated. In U.S. 3,340,200 a dilute aqueous solution of sodium chloride is first used in a regeneration of the contaminated mixed bed ion exchange resin followed by contact of the resin with a concentrated aqueous sodium chloride solution and evaporation to dryness of the dilute solution which removes most of the radioactive contaminants, leaving a small quantity of the sodium chloride salt containing traces of radioactive impurities which can be disposed of conveniently. The concentrated sodium chloride solution is diluted with water and subsequently used as the dilute aqueous solution of sodium chloride for the next regeneration. The ion exchange resins are either reused or otherwise disposed of with minimal precautions. However, this regeneration technique using various salt solutions and evaporation of the salt solution to dryness leaving the dried salt containing traces of the radioactive contaminants and disposal of the dried salt does not solve all of the problems incurred in disposing of ion exchange resins containing radioactive contaminants. First the particulate matter, such as corrosion products, and colloidal entities which are removed by the ion exchange resin and which are also contaminated with radioactive materials, will not be removed by the aqueous salt solution. These radioactively contaminated particles and entities remain in the ion exchange resin even after the regeneration technique. Furthermore, even if substantial amounts of the radioactively contaminated ionic constituents are removed by regeneration at least minor amounts of the radioactively contaminated ionic constituents are retained by the ion exchange resin, and some ion exchange resins become too "hot" or too degraded to be effectively regenerated. These ion exchange resins are generally disposed of by placing the ion exchange resins in cement or steel containers, sealing the containers and placing the containers in burial sites. In many cases regeneration is unwarranted because the regenerant waste water would occupy 4 to 5 times the volume of the resin itself and thus would require either evaporating a large volume of liquid or disposing of a volume much greater than the volume of the resin.

Radioactively contaminated ion exchange resins must be disposed of in areas which will be least harmful to the safety of man and his environment, and in view of the fact that there are ever increasing quantities of radioactive materials to be destroyed and disposed of either in the ocean or in underground burial sites, space for dumping and large volume handling is critical, and there is a need for reducing the amount of material requiring handling and disposal in these sites.

OBJECTS OF THE INVENTION

Accordingly, it is an object of this invention to provide an economical method for the disposal of synthetic organic ion exchange resins which contain radioactive contaminants.

It is another object of this invention to provide a method of treating synthetic organic ion exchange resins having radioactive contaminants wherein the radioactive contamination remains in the ion exchange resins during and after treatment.

It is another object of this invention to provide a process for treating radioactively contaminated synthetic organic ion exchange resins for disposal without decomposing the resin.

Still another object of this invention is to provide a method for the disposal of synthetic organic ion exchange resins containing radioactive contaminants in substantially less space than heretofore required for the storage and/or disposal of such resins.

Another object of this invention is to provide a process for treating synthetic organic ion exchange resins containing radioactive contamination which will promote the burning of the ion exchange resins in cases where incineration techniques are applicable to disposal of the resin.

Other objects and advantages of this invention will become apparent from the following detailed description.

SUMMARY OF THE INVENTION

Briefly, the present invention comprises contacting the synthetic organic ion exchange resins containing radioactive contamination with a water soluble, non-ionic, organic solvent having a dielectric constant lower than about 45 to reduce substantially the volume of the ion exchange resins containing radioactive contamination prior to storage and/or disposal. The action of a specific class of organic solvents reduces the volume of the ion exchange resins which are radioactively contaminated to a volume which is substantially less than the original volume of the ion exchange resin and thereby substantially reduces the amount of space required for the storage or disposal of the radioactively contaminated ion exchange resins. When cement or steel containers are used for storage and/or burial of the radioactively contaminated ion exchange resins, either substantially greater amounts of ion exchange resin can be placed in the cement or steel containers, or smaller cement or steel containers can be used for the disposal of the resin.

In order to provide effective reduction in volume of the synthetic organic ion exchange resins which have been contaminated with radioactive materials without contaminating other constituents or ingredients used in the process, it is critical that the solvent used to reduce the volume of the ion exchange resins be organic, water soluble, and non-ionic, and that it have a dielectric constant lower than about 45.

The present invention also comprises a process wherein the radioactively contaminated ion exchange resin is dried either at intervals during the contacting of the resin with the organic solvents or after substantial reduction in volume of the ion exchange resin has occurred from treatment with the organic, non-ionic, water soluble solvent. A stream of drying gas, such as air, or mild heat which is insufficient to decompose the ion exchange resin, may be used to dry the resin.

DESCRIPTION OF THE PREFERRED EMBODIMENTS

Figure 1:
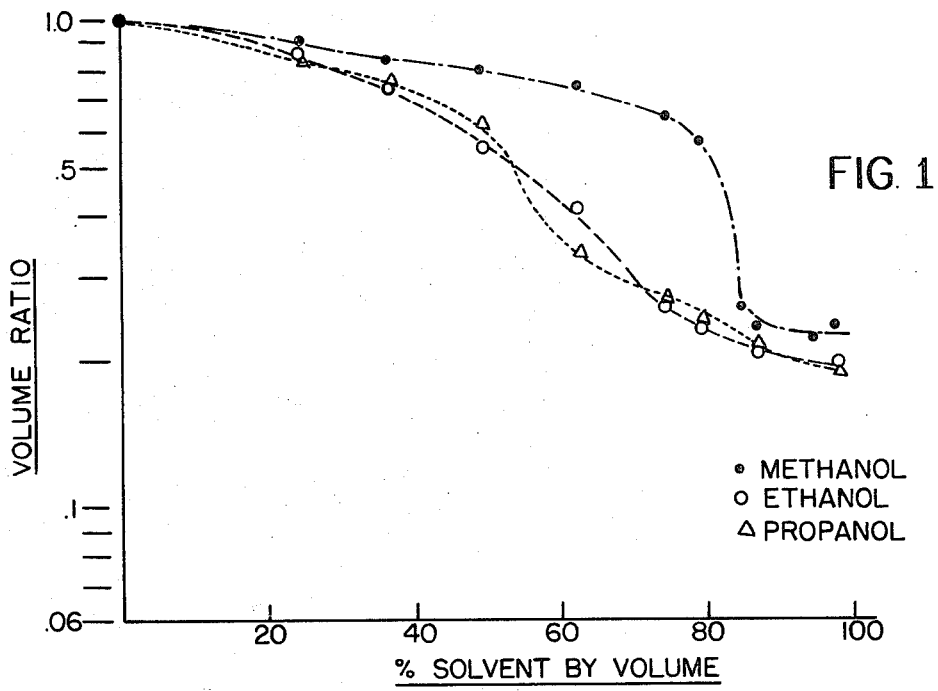
FIG. 1 is a graph showing the effect of alcohol-water mixtures on the volume ratio of a low, cross-linked, sulfonated polystyrene resin.

The preferred method of carrying out this invention comprises contacting the ion exchange resin which is contaminated with radioactive material, with a sufficient amount of a water soluble, non-ionic, organic solvent having a dielectric constant of about 45 or lower. By a sufficient amount of water soluble, non-ionic, organic solvent I mean that amount of solvent which reduces the volume of the ion exchange resin by about 10 to 60% of the original volume. The radioactively contaminated ion exchange resin which has been reduced in volume is then placed in a suitable container for storage and/or disposal.

In the present invention it is critical that the solvent be organic, water soluble, and non-ionic, and that it have a dielectric constant lower than the dielectric constant of water, and preferably, when measured at a temperature of 20° C., a dielectric constant of about 45 or lower. Other factors which may be useful in choosing a solvent for the practice of this invention and relating to economy, are the low cost of the solvent and the ease of recovery of the solvent for reuse. The invention is inoperable if the solvent selected for the practice of the present invention is not characterized by all of the critical factors set forth above.

The solvent must be water soluble so that most of the water retained on the surface or within the resin bead or particle will be removed with the solvent. Thus, by water soluble I mean that the water must be soluble in the solvent which is used to reduce the volume of the resin. Ion exchange resins swell in water which has a dielectric constant of about 80 at 20° C. and about 78 at 25° C., more than in solvents with lower dielectric constants, and ion exchange resins sorb the solvents in which they are placed. When the ion exchange resins are exposed to an aqueous medium, the ion exchange resin swells as its sorbs the water until an equilibrium is attained beyond which swelling does not occur. Thus, it is necessary to have a water soluble solvent to remove or leach the water which is held or sorbed in the ion exchange resin bead or particle. As the water is removed from the ion exchange resin bead or particle the bead or particle shrinks and is thereby reduced in volume. Although it is not necessary to practice the present invention, it is preferred that as much of the aqueous medium contacting the radioactively contaminated ion exchange resin be mechanically removed prior to treatment of the resin with the water soluble solvent to conserve solvent.

In order to practice the present invention the solvent must be non-ionic. By using a non-ionic solvent there will be little or no removal of the ionic components from the radioactively contaminated ion exchange resins, and the radioactively contaminated ionic components which have been removed from the aqueous medium, will remain on the ion exchange resin and will not exchange with ionic components of the solvent. If unpermissible quantities of radioactive species are eluted in the solvent, the solvent can be diluted with water until the dielectric constant of the water-solvent mixture has a dielectric constant greater than about 45, and the water-solvent mixture can subsequently be passed through a fresh bed of ion exchange resins for removal of the radioactive species.

The solvents which are useful in this invention must be organic in nature to produce the desired effect of reducing the volume of the radioactively contaminated ion exchange resin without removing the radioactive ionic components from the ion exchange resin. Inorganic solvents (liquids) which would normally remove water from the ion exchange resin and thereby cause shrinkage of the resin, cannot be used in the present invention even though there may be a slight tendency of the inorganic solvent to shrink the resin, because such inorganic solvents have ionic components which exchange with the radioactive ionic components on the ion exchange resin. Furthermore, inorganic solvents are generally aqueous solutions, and such solutions of the inorganic solvent would merely attain an equilibrium with the water sorbed in the ion exchange resin causing incomplete water removal and thereby resulting in only minor reduction in volume, if any, of the radioactively contaminated ion exchange resin.

Ion exchange resins when contacted with an organic solvent of lower dielectric constant than water, shrink in volume. This is due to the dewatering or removal of water from the ion exchange resin by the action of the solvent in which water is soluble and designated herein as water soluble solvent. As used herein the water removed from the ion exchange resin includes water and its isotopic forms known as heavy water. Although there is some minor shrinkage of ion exchange resins when organic solvents having a lower dielectric constant than water, that is, lower than about 80 are used, the shrinkage or reduction of volume of the ion exchange resins is greatest when the dielectric constant of the organic solvent is about 45 or lower. Suitable organic solvents which may be used in this invention, can be found in the tables of dielectric constants for organic liquids in any chemical handbook. The solvents which are useful in the present invention in addition to being organic, nonionic, water soluble and having a dielectric constant of about 45 or lower, must not decompose or react with the polymeric composition of the radioactively contaminated ion exchange resin, that is, the solvent must be inert to the resin being treated. Any organic solvent which will decompose or react with the polymer, will cause the loss of the radioactive ionic constituents held on the radioactively contaminated ion exchange resin and thereby cause an excessive amount of radioactive contamination in the solvent which is being used to reduce the volume of the ion exchange resin by the dewatering process.

Solvents having a dielectric constant of about 45 or lower are also desirable because they cause reduction or a complete cessation of ion exchange. Complete ionization of stronger polar constituents occurs in liquid media with a dielectric constant (measured at 25° C.) greater than about 45. Thus, when ion exchange resins are in a liquid medium having a dielectric constant greater than about 45, ion exchange occurs because the polar group on the resin is ionized, and the reaction is between the ions in solution and the ions of the resin. However, when the dielectric constant of the liquid medium is about 45 or lower, ion pair formation or association of the ionic constituents occurs, and ion exchange ceases. Accordingly, in order to prevent ion exchange between the organic solvent and the liquid medium the dielectric constant must be about 45 or lower.

Suitable organic, non-ionic, water soluble solvents which may be used in the present invention, are methyl alcohol having a dielectric constant of 32.63 at 25° C., ethyl alcohol having a dielectric constant of 24.3 at 25° C., acetone having a dielectric constant of 20.7 at 25° C., 1-propanol having a dielectric constant of 20.1 at 25° C., 2-propanol having a dielectric constant of 18.3 at 25° C., 1,4-dioxane having a dielectric constant of 2.2 at 25° C., ethyl ether having a dielectric constant of 4.33 at 20° C. and the like. The most suitable solvents for the practice of this invention are the low cost solvents which may be readily recovered for reuse in the reduction of additional batches of radioactively contaminated ion exchange resins.

Caution must be exercised in the selection of the water soluble, non-ionic organic solvent having a dielectric constant lower than that of water for the dewatering of the ion exchange resin so that the solvent which is selected will not be catalytically decomposed by the ion exchange resin, or so that the solvent will not decompose the ion exchange resin. For example, acetone is catalytically decomposed by strong base resins in the $OH^-$ form. Certain other ion exchange resins are decomposed by acetone. In such cases, it is preferred that some other type of solvent be utilized for the practice of the invention, and it is within the purview of one skilled in the art to select a solvent which will not be decomposed by the resin or which will not decompose the ion exchange resin.

The present invention contemplates the use of a single solvent for the dewatering of the radioactively contaminated ion exchange resin or a combination of two or more suitable solvents to reduce the volume of the radioactively contaminated ion exchange resins. For example, a mixture of methanol and ethanol may be easily used in the practice of the present invention.

The amount of water soluble, non-ionic organic solvent which may be used to reduce the volume of the ion exchange resin containing radioactive contamination, is dependent upon such factors as concentration of the solvent, the type of solvent used, the dielectric constant of the solvent, the amount of aqueous medium in which the resin is suspended or which adheres to the resin beads or particles, and the solubility of water in the solvent. The amount of solvent to reduce the volume of the resin can be readily determined by simple tests on non-contaminated resins conducted by one skilled in the art. The determination may be made by placing a sample of the resin to be reduced in volume in a tube such as a burette and contacting the resin with the desired solvent until the resin becomes reduced to the desired volume. Another method for determining completion of shrinkage is by measuring the dielectric constant of the effluent. The end point (completion of shrinkage) is when the effluent and influent have about the same dielectric constant. These techniques will be indicative of the amount of solvent which will reduce the volume of the resin to the desired volume and as used herein is a sufficient amount of solvent. For purposes of handling, disposal and storage, it is contemplated that the ion exchange resin be reduced by about 10 to 60% of the original volume.

The ion exchange resins which are contaminated with radioactive materials, to which the present invention applies, are those ion exchange resins which belong to the class of synthetic, organic ion exchange resins. They may be cation exchange resins, anion exchange resins or mixed bed resins. The synthetic organic ion exchange resins which are used in nuclear applications, consist essentially of a cross-linked polymer network to which are attached ionized or ionizable groups. In the case of cation exchange resins, these groups are acidic groups, e.g., $-SO_3H$, $-PO_3H_2$, $-CO_2M$, phenolic hydroxyl, while in anion exchange resins the groups are basic in character, e.g., quaternary ammonium, aliphatic or aromatic amine groups. The nuclear grade ion exchange resins marketed by Ionac Chemical Company under the NC, NA or NM series may have $H^+$, $K^+$, $Li^+$, $NH_4^+$ or $OH^-$ ionic forms or combinations thereof and have found broad application in nuclear reactor systems. The ionizable groups may be attached to the monomers or intermediates used in the preparation of the cross-linked polymer, or they may be introduced subsequently to a preformed polymer. Most of the cation exchange resins are prepared by sulfonating styrene-divinylbenzene copolymers. Strongly basic anion exchange resins are prepared by treating cross-linked polystyrene with chloromethyl ether in the presence of a Friedel-Crafts catalyst. The chloromethylated product is then treated with a tertiary amine, e.g., trimethyl amine, to give a resin containing strongly basic quaternary ammonium groups. The cross-linked polystyrene is generally a copolymer with up to about 10% divinylbenzene. Additional details on the structure and synthesis of ion exchange resins can be found in the book "Ion Exchange," by F. Helferrich, McGraw-Hill Book Co., Inc. (1962).

In general, the degree or amount of shrinkage of the ion exchange resin depends upon the amount of cross-linking of the polymer. On p. 102 of the book "Ion Exchange" by Helferrich it is stated that highly cross-linked resins have a reduced ability to swell. Accordingly, it follows that the lower the cross-linking in the polymer, the greater the ability to swell. Therefore, it also follows that the lower the cross-linking of the polymer, the greater the shrinkage or reduction in volume of the ion exchange resin. In any event, the ion exchange resins which are treated by the process of the present invention, are those resins which have been exposed to an aqueous medium and are generally in a state of exhaustion, that is, they can no longer effectively reduce the ionic constituents in the aqueous medium, and are in a state of maximum or near maximum swelling. Whether the ion exchange resin or resins consist of an organic polymer of either high or low cross-linking, the present invention applies, and dewatering of the ion exchange resin or resins by the organic, non-ionic, water soluble solvent having a dielectric constant lower than water and thereby causing shrinking, will occur.

Since lower cross-linking of the polymer results in a greater degree of shrinkage of the ion exchange resin when the ion exchange resin is dewatered in accordance with the present invention, and since radiation generally has a decross-linking effect on the cross-linked organic polymer, the radiation from the radioactive contamination or from the reactor itself, enhances the practice of the present invention.

Reduction of volume of the ion exchange resin by the method of this invention is carried out in such a way that the polymer is not decomposed, and the volume may be restored or at least partially restored at a subsequent time by the addition of water or an aqueous medium. This property of restoration, among other things, finds application in a safety feature which will aid in the prevention of contamination of the area surrounding the burial site in the event a very slight opening or minute crack develops in a sealed storage or disposal container which contains the radioactively contaminated ion exchange resin which has been reduced in volume. Any water or aqueous medium, will cause a swelling of the ion exchange resin to a higher volume thus producing a self-sealing effect at the point of the slight opening or crack as the resin expands. Exchange of the radioactive ionic species by the aqueous medium will not take place until the dielectric constant is above the point where the ion pairs ionize, i.e., above about 45. Only when the ion pairs become ionized will ion exchange occur. Thus, the resin will be in a safe state until the dielectric constant exceeds about 45.

Figure 2:
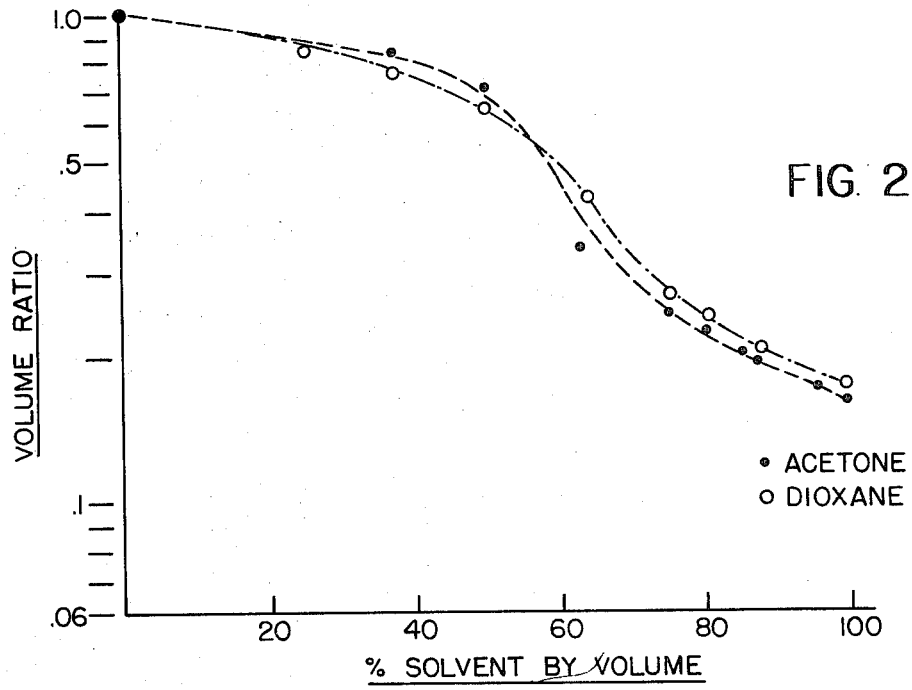
FIG. 2 is a graph showing the effect of acetone and dioxane-water mixtures on the volume ratio of a low, cross-linked, sulfonated polystyrene resin.

The graphs in FIGS. 1 and 2 clearly show the marked effect of various solvents on the volume of the ion exchange resins. In both FIGS. 1 and 2 a non-radioactive, sulfonated low cross-linked polystyrene resin was contacted with an organic, non-ionic, water soluble solvent having a dielectric constant of about 45 or lower. The effect of the solvent on the volume of the ion exchange resin is shown on semi-log scale wherein the volume ratio, that is the ratio of the final volume to the original volume of the ion exchange resin, is plotted against the percent solvent (by volume). FIG. 1 represents the effect of methanol, ethanol and propanol on the reduction of volume of the non-radioactive ion exchange resin. FIG. 2 represents the effect of acetone and dioxane on the reduction of volume of the non-radioactive ion exchange resin.

In the preferred embodiment of this invention water containing ionic species to be removed, is passed through a bed of ion exchange resin material until the bed is exhausted. The water is then removed from the bed of exhausted ion exchange resin, and a suitable organic, non-ionic, water soluble solvent is passed through the bed until there is a sufficient drop in bed volume. The bed is then drained of the excess solvent. At this point the ion exchange resin may be dried, if desired, by suitable means to remove residual liquids such as solvent and/or water, without decomposing the resin. Drying by passing a drying gas, such as air, nitrogen and the like, through the resin bed and/or by applying mild heat to the resin are considered suitable drying means. For example, when a non-radioactive mixed bed of nuclear grade ion exchange resins (Ionac Nuclear Grade Ion Exchange Resin NM-40) in the exhausted form consisting of a standard cross-linked cation exchange resin and a standard anion exchange resin, was treated in a tube with acetone, there was a reduction in volume of the ion exchange resin bed by 42.7%. When the solvent treatment step was followed by passing warm air over the resin bed, the volume of the resin bed was reduced by an additional 2.2%.

When the radioactively contaminated ion exchange resins are disposed of by formation of a "building block," the resin may be reduced in volume and thoroughly dried by the method of this invention before incorporation into the block or brick. Drying may be effected by passing a stream of drying gas or applying mild heat or both to the resin which has been reduced in volume.

When radioactively contaminated ion exchange resins are disposed of by incineration, the method of this invention may be used to remove water from the resin prior to burning. The treatment of the resin with the organic non-ionic, water soluble solvent removes the water from the resin, and thereby facilitates burning of the resin. The resin may be incinerated after the solvent treatment step or after the drying step.

The above examples are not meant to limit the scope of the invention or the applications to which this invention may be directed. It is to be understood that although the invention has been described with specific reference to particular embodiments thereof, it is not meant to be so limited, since changes and alterations therein may be made which are in the full intended scope of the invention as defined by the appended claims.

I claim:

1. A method of treating a radioactively contaminated, synthetic organic ion exchange resin which comprises contacting said radioactively contaminated ion exchange resin with an organic, water soluble, non-ionic solvent having a dielectric constant of about 45 and lower to reduce the volume of said radioactively contaminated ion exchange resin.

2. A method in accordance with claim 1 further comprising drying said radioactively contaminated ion exchange resin by a suitable means to remove residual liquid from said ion exchange resin without decomposing said ion exchange resin.

3. A method in accordance with claim 1 wherein said organic, water soluble, non-ionic solvent is selected from the group consisting of methanol, ethanol, 1-propanol, 2-propanol, acetone, dioxane and ethyl ether.

4. A method of processing a radioactively contaminated synthetic organic ion exchange resin comprising, contacting said radioactively contaminated synthetic organic ion exchange resin with an organic, water soluble, non-ionic solvent having a dielectric constant of about 45 and lower to reduce the volume of said ion exchange resin; removing said organic, water soluble, non-ionic solvent from said ion exchange resin; and placing said ion exchange resin having a reduced volume in containers suitable for storage and disposal.

5. A method in accordance with claim 4 further comprising drying said ion exchange resin by a suitable means to remove residual liquid from said ion exchange resin without decomposing said ion exchange resin.

6. A method in accordance with claim 4 wherein said organic, water soluble, non-ionic solvent is selected from the group consisting of methanol, ethanol, 1-propanol, 2-propanol, acetone, dioxane and ethyl ether.

7. A method of processing a radioactively contaminated synthetic organic ion exchange resin in contact with an aqueous medium containing radioactive constituents comprising the steps of:
   (a) removing said aqueous medium from said ion exchange resin;
   (b) contacting said ion exchange resin with a sufficient amount of organic, non-ionic, water soluble solvent having a dielectric constant of about 45 and lower to reduce the volume of said ion exchange resin by at least about 10%;
   (c) removing said organic, water soluble, non-ionic solvent from said ion exchange resin; and
   (d) disposing of said ion exchange resin having a reduced volume.

8. A method in accordance with claim 7 wherein said ion exchange resin is disposed of by burning.

9. A method in accordance with claim 7 wherein said ion exchange resin is disposed of by placing said ion exchange resin in a container suitable for disposal.

10. A method in accordance with claim 7 further comprising drying said ion exchange resin prior to disposal with suitable means to promote removal of residual liquid and additional reduction in volume of said ion exchange resin without decomposing said ion exchange resin.

11. A method in accordance with claim 10 wherein said means to promote removal of residual liquid and additional reduction in volume of said ion exchange resin comprises contacting said ion exchange resin with air.

12. A method in accordance with claim 10 wherein said means to promote removal of residual liquid and additional reduction in volume of said ion exchange resin comprises applying mild heat to said ion exchange resin.

References Cited

UNITED STATES PATENTS

| | | | |
|---|---|---|---|
| 2,855,371 | 10/1958 | Abrams | 260—2.2 |
| 3,340,200 | 9/1967 | Noble | 252—301.1 |
| 3,298,961 | 1/1967 | Davis et al. | 252—301.1 |
| 2,616,847 | 11/1952 | Ginell | 252—301.1 |

OTHER REFERENCES

Samuelson: Ion Exchange Separations in Analytical Chemistry, 1963, pp. 139–40.

Nachod et al.: Ion Exchange Technology, 1956, pp. 276, 510, 511.

Marcus et al.: Ion Exchange and Solvent Extraction of Metal Complexes, 1969, p. 412.

CARL D. QUARFORTH, Primary Examiner

R. L. TATE, Assistant Examiner

U.S. Cl. X.R.

252—301.1 R